United States Patent
Pilzweger (10) Patent No.: US 12,060,044 B2
(45) Date of Patent: Aug. 13, 2024

(54) METHOD FOR ACTUATING A PARKING BRAKE SYSTEM IN A COMMERCIAL VEHICLE, PARKING BRAKE SYSTEM FOR A COMMERCIAL VEHICLE AND COMMERCIAL VEHICLE WITH THE PARKING BRAKE SYSTEM

(71) Applicant: ZF Friedrichshafen AG, Friedrichshafen (DE)

(72) Inventor: Hans Pilzweger, Neuhaus am Inn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 207 days.

(21) Appl. No.: 17/577,721

(22) Filed: Jan. 18, 2022

(65) Prior Publication Data
US 2022/0274577 A1    Sep. 1, 2022

(30) Foreign Application Priority Data
Mar. 1, 2021  (DE) ..................... 10 2021 201 892.0

(51) Int. Cl.
*B60T 13/74* (2006.01)
*B60T 8/17* (2006.01)
*B60T 8/18* (2006.01)

(52) U.S. Cl.
CPC .......... *B60T 13/741* (2013.01); *B60T 8/1701* (2013.01); *B60T 8/18* (2013.01)

(58) Field of Classification Search
CPC ........ B60T 13/741; B60T 8/1701; B60T 8/18; B60T 7/14; B60T 8/1708; B60T 17/22;
(Continued)

(56) References Cited

U.S. PATENT DOCUMENTS 7,604,302 B1 * 10/2009 Lee ...................... B60T 13/662
                                                               303/3
8,352,144 B2    1/2013 Benter et al.
(Continued)

FOREIGN PATENT DOCUMENTS

DE            102 00 783 A1    7/2003
DE      10 2007 046 484 A1    4/2009
(Continued)

OTHER PUBLICATIONS

German Patent Office, Search Report issued in German Patent Application No. 10 2021 201 892.0 (Nov. 2, 2021).

*Primary Examiner* — Xiao En Mo
(74) *Attorney, Agent, or Firm* — Finch & Maloney PLLC (57) ABSTRACT

Disclosed is a method for actuating a parking brake system in a utility vehicle. In an example, the parking brake system includes an operational actuator for actuating a parking brake and a control unit for controlling the operational actuator. When the utility vehicle is stopped, a stored brake-application characteristic is selected for the parking brake as a function of a current vehicle condition of the utility vehicle. Based on the selected application characteristic, the operational actuator is activated by the control unit in order to apply the parking brake. In addition, or alternately, when the utility vehicle is started, a stored brake-release characteristic is selected for the parking brake as a function of a current vehicle condition of the utility vehicle. Based on the selected brake-release characteristic, the operational actuator is activated by the control unit in order to release the parking brake.

19 Claims, 3 Drawing Sheets

(58) Field of Classification Search
CPC .......... B60L 7/24; B60L 7/26; B60L 15/2072;
B60L 2200/40
See application file for complete search history.

(56) References Cited

U.S. PATENT DOCUMENTS 10,442,413 B2    10/2019  Tanaka et al.
2021/0402970 A1* 12/2021  Reichert ................. B60T 8/885

FOREIGN PATENT DOCUMENTS

| DE | 10 2013 201 393 A1 | 7/2014  |
|----|--------------------|---------|
| DE | 11 2016 001 571 T5 | 12/2017 |
| DE | 10 2019 002 753 A1 | 10/2019 |
| DE | 10 2018 128 946 A1 | 5/2020  |

* cited by examiner

METHOD FOR ACTUATING A PARKING BRAKE SYSTEM IN A COMMERCIAL VEHICLE, PARKING BRAKE SYSTEM FOR A COMMERCIAL VEHICLE AND COMMERCIAL VEHICLE WITH THE PARKING BRAKE SYSTEM

RELATED APPLICATIONS

This application claims the benefit of and right of priority under 35 U.S.C. § 119 to German Patent Application no. 10 2021 201 892.0, filed Mar. 1, 2021, the contents of which are incorporated herein by reference in its entirety.

BACKGROUND

The invention relates to a method for actuating a parking brake system in a utility vehicle, the said method having the features described in the preamble of claim 1. In addition, the invention relates to a parking brake system for a utility vehicle and to a utility vehicle with the said parking brake system.

It is usual for tractors to be equipped with a parking brake, which in defined driving situations, for example when the driver leaves his driving seat, is applied automatically or manually. Such parking brakes can for example be electric, hydraulic or mechanical. The parking brake is as a rule applied and released by a continual movement of an actuating unit.

For example, the document DE 10 2007 046 484 A1 describes a method for controlling an electro-mechanical parking brake system of a vehicle, in which the electro-mechanical parking brake system comprises at least one actuating element, at least one mechanical braking unit and at least one control unit, wherein for the braking of the vehicle when it is at rest the actuating element is actuated and as a function of that, under the control of a control and evaluation routine implemented in the control unit, the at least one mechanical braking unit is applied at a predetermined rate of application, wherein the speed of the vehicle at the time when the at least one actuating element is actuated is determined, and the said application rate of the mechanical braking unit is chosen as a function of the vehicle speed determined.

SUMMARY

The purpose of the present invention is to propose a method that enables better operation of the vehicle, in particular with varying load conditions. In addition, a further purpose of the invention is to propose a corresponding parking brake system and a corresponding utility vehicle equipped with the said parking brake system.

This objective is achieved by a method having the features specified in claim 1, a parking brake system having the features specified in claim 10 and a utility vehicle having the features specified in claim 14. Preferred or advantageous embodiments of the invention emerge from the subordinate claims, from the description given below and from the attached figures.

The object of the invention is a method for actuating a parking brake system in a utility vehicle. The utility vehicle is preferably an agricultural towing vehicle, particularly one in the form of a tractor.

The parking brake system comprises an operational actuator designed and/or suitable for actuating a parking brake. In particular the parking brake serves to lock at least one vehicle wheel when the vehicle is at rest. Preferably, the operational actuator has the function of transmitting an actuating force and/or an adjusting movement to at least one wheel brake of the vehicle, in order to lock and/or brake the said at least one vehicle wheel when the vehicle is at rest and/or is in the parked condition. Preferably, the operational actuator is in the form of a mechanical and/or electric and/or hydraulic operational actuator.

The parking brake system comprises a control unit designed and/or suitable for controlling the operational actuator. In particular the control unit has the function of controlling the actuation of the parking brake, in particular its application and release, by the operational actuator. Preferably the operational actuator is controlled by way of an operating element provided inside the vehicle, for example a button, a rocker switch or the like. Alternatively, or optionally in addition, the parking brake is applied automatically after a specified time at rest and/or released automatically when starting off.

The method is characterized by the following steps:
  selection of a brake-application characteristic stored in the control unit for the parking brake, as a function of a driving condition of the utility vehicle when the utility vehicle is being stopped;
  activation of the operational actuator on the basis of the brake-application characteristic by the control unit in order to apply the parking brake; and/or
  selection of a brake-release characteristic stored in the control unit for the parking brake, as a function of a driving condition of the utility vehicle when the utility vehicle is starting off;
  activation of the operational actuator on the basis of the brake-release characteristic by the control unit in order to release the parking brake.

In particular, the brake-application characteristic is selected after the vehicle has stopped and/or is at a standstill. In particular, the brake-release characteristic is selected before driving off and/or while the vehicle is still at rest. More especially, for different vehicle conditions different bake-application and/or brake-release characteristics are stored. Vehicle conditions are preferably understood to be different load conditions of the utility vehicle, for example due to the attachment of working equipment and/or the transport of different loads.

The particular advantage of the invention is that by virtue of the choice of an appropriate brake-application and/or brake-release characteristic, the actuation of the parking brake as a function of the condition of the vehicle is improved. For example, starting off with large loads, such as when transporting heavy loads, and/or on steeply inclined surfaces, is simplified thereby. Furthermore, by the selection of appropriate characteristics the braking force distribution can be optimized for the corresponding vehicle condition, so that the driving comfort when starting and/or stopping is improved.

In a specific implementation it is provided that on the basis of the characteristic, a travel path of the operational actuator is adjusted as a function of time. In particular, on the basis of the characteristic a braking force acting on the parking brake over a predetermined time interval is varied, in that the operational actuator is moved along the travel path. Preferably, the operational actuator is moved over the travel path between a brake-application position and a brake-release position. In particular, for different vehicle conditions different time intervals can be set, within which the operational actuator is actively moved. For example, with heavy loads the release of the parking brake is delayed and its application is accelerated. Thus, a method is proposed which is characterized by simple and individual control of the operational actuator.

In a further version it is provided that a first vehicle condition is defined by operating the vehicle while it is unloaded. In particular, during unloaded operation the vehicle is empty and/or unencumbered. Alternatively, or optionally in addition, a further vehicle condition is defined by operating the vehicle with a trailer. In particular, in such trailer operation at least one attachment, in particular a trailer, is connected to the vehicle. Alternatively, or optionally in addition, a further vehicle condition is defined by loaded operation of the utility vehicle. In particular, in such loaded operation the vehicle itself and/or an attachment, particularly the trailer, is loaded. For each vehicle condition a respectively associated brake-application and/or brake-release characteristic is stored in the control unit. In particular, in that way for each vehicle condition an optimum brake-application and/or brake-release strategy is implemented.

In a further specific example, it is provided that for unloaded operation, an unloaded-operation brake-application characteristic and an unloaded-operation brake-release characteristic are stored. The unloaded-operation brake-application characteristic and the unloaded-operation brake-release characteristic each follow a linear course. Thus, during unloaded operation, on the basis of the unloaded-operation brake-application characteristic the parking brake is applied progressively and on the basis of the unloaded-operation brake-release characteristic the parking brake is released progressively. In particular, on the basis of the unloaded-operation brake-application characteristic the operational actuator is moved from the brake-release position to the brake-application position, and/or on the basis of the unloaded-operation brake-release characteristic it is moved from the brake-application position to the brake-release position, in each case at a constant rate and/or without interruption. Preferably, between the brake-release position and the brake-application position the unloaded-operation characteristic follows a strictly monotonically rising characteristic course over the entire travel path. Preferably, between the brake-application position and the brake-release position the unloaded-operation characteristic follows a strictly monotonically falling characteristic course over the entire travel path.

In a further specific embodiment it is provided that for trailer operation, a trailer-operation brake-application characteristic and a trailer-operation brake-release characteristic are stored. The trailer-operation brake-application characteristic and the trailer-operation brake-release characteristic each have, in sections, a constant characteristic shape due to the provision of at least one, or exactly one waiting period. In this case, during trailer operation, on the basis of the trailer-operation brake-application characteristic, after the lapse of the said waiting period the parking brake is fully applied, and on the basis of the trailer-operation brake-release characteristic, after the lapse of the waiting period the parking brake is fully released. In particular, on the basis of the trailer-operation brake-application characteristic the operational actuator is moved from the brake-release position to the brake-application position, and/or on the basis of the trailer-operation brake-release characteristic it is moved from the brake-application position to the brake-release position, in each case step by step and/or with at least one interruption. Preferably, between the brake-release position and the brake-application position the trailer-operation characteristic follows a strictly monotonically rising characteristic course over the entire travel path. Preferably, between the brake-application position and the brake-release position the trailer-operation characteristic follows a strictly monotonically falling characteristic course over the entire travel path. Since the holding brakes of a trailer react with some delay when the parking brake is applied, the brakes of the trailer can be released within the waiting period when starting off and can be applied within the waiting period when stopping. Thus, for example, starting of the vehicle in opposition to the brakes of the trailer, whose release has been delayed, and when stopping, rolling backward of the tractor-trailer combination on an incline, can be prevented.

In a further development it is provided that for loaded operation, a loaded-operation brake-application characteristic is stored. Compared with the unloaded-operation brake-application characteristic and/or the trailer-operation brake-application characteristic, the loaded-operation brake-application characteristic follows a steeper course. Thus, on the basis of the loaded-operation brake-application characteristic the parking brake is applied more rapidly than it is in unloaded operation or in trailer operation. In particular, on the basis of the loaded-operation brake-application characteristic the operational actuator is moved from the brake-release position to the brake-application position at a higher rate compared with unloaded operation or trailer operation. Preferably, between the brake-release position and the brake-application position the loaded-operation brake-application characteristic follows a strictly monotonically rising course over its entire travel path. Due to the rapid application of the parking brake when in loaded operation, the vehicle can be prevented from rolling onward due to high loads when it is stopped.

In a further version it is provided that for loaded operation, a loaded-operation brake-release characteristic is stored. By providing a number of pauses, the loaded-operation brake-release characteristic follows a stepped course. In this case, in loaded operation, on the basis of the loaded-operation brake-release characteristic the parking brake is released in steps. In particular, the plurality of pauses are each of the same length in time. For example, the pauses are the same distance apart and/or are uniformly distributed. In particular, on the basis of the loaded-operation brake-release characteristic the operational actuator is reduced in steps over the entire travel path from the brake-application position to the brake-release position. Preferably, between the brake-release position and the brake-application position the loaded-operation brake-release characteristic follows a monotonically falling course over the entire travel path. By virtue of the step by step release a clutch modulation can be made possible so that starting off, especially on a steeply inclined surface and/or with a heavy load, is improved.

In a further specific embodiment it is provided that the condition of the vehicle is recognized automatically. In particular, the vehicle can be fitted with at least one sensor such as a force and/or weight sensor, in order to recognize a load and/or to distinguish between unloaded operation and loaded operation. Alternatively, or optionally in addition, the vehicle can be fitted with at least one further sensor to recognize an attachment and/or to identify a special feature of the attachment. When the vehicle is stopped, on the basis of the vehicle condition identified an associated brake-application characteristic is selected. In particular, a corresponding brake-application characteristic is chosen when the parking brake is applied by the user himself or automatically. When starting off, on the basis of the vehicle condition identified an associated brake-release characteristic is selected when the parking brake is released by the user himself or automatically. Optionally, in addition to the condition of the vehicle at least one further vehicle parameter such as the position of the vehicle, the speed of the vehicle, the travel direction or suchlike can be taken into account and a corresponding brake-application and/or brake-release characteristic can then be chosen on the basis of the vehicle condition identified and the said at least one vehicle parameter. By selecting the brake-application or brake-release characteristic on the basis of the vehicle condition identified, it is ensured that for any vehicle condition, the appropriate brake-application or brake-release characteristic is chosen.

In a further implementation it is provided that the brake-application characteristic is selected manually and/or automatically on the basis of the condition of the vehicle. In principle, the user can select the appropriate brake-application or brake-release characteristic, according to need, by manual means such as by an input device on the basis of a current vehicle condition. Alternatively, or optionally in addition, the appropriate brake-application or brake-release characteristic can be selected on the basis of a current vehicle condition but also automatically by the control unit. For example, for that purpose at least one selection criterion can be stored in the control unit, with reference to which a brake-application or brake-release characteristic that is suitable for the vehicle at the time is selected.

A further object of the invention relates to a parking brake system as already described above, which is designed and/or suitable for a utility vehicle. In particular, the parking brake system serves to carry out the method as described above and in accordance with any of claims 1 to 10.

The parking brake system comprises the operational actuator for actuating the parking brake. In this case the operational actuator can be moved along a travel path between a brake-application position and a brake-release position in order to transmit a braking force to at least one, or to exactly one wheel brake cylinder. In particular, the wheel brake cylinder is part of a service brake which is designed to slow down and/or stop the vehicle when it is driving. The service brake preferably comprises a brake actuator which acts directly on the wheel brake cylinder to actuate the service brake. The operational actuator can act indirectly or directly upon the wheel brake cylinder. Preferably, at least the operational actuator is coupled to a summation shaft, which distributes the braking forces acting between at least two wheel brake cylinders of the service brake, in particular on the rear axle.

In addition, the parking brake system comprises the control unit for controlling the operational actuator, wherein the control unit comprises a control module which is designed to actuate the operational actuator when the utility vehicle starts and/or stops. The control unit is preferably in the form of a control device of the vehicle.

In the context of the invention it is proposed that the control unit comprises a selector module which is designed, on the basis of the condition of the vehicle, to select a brake-application and/or a brake-release characteristic stored in the control unit for the parking brake. In the simplest version the selector module is designed to choose the brake-application and/or brake-release characteristic on the basis of a selection command and send it to the control unit. The selector module is preferably connected so as to exchange signals with the control module in order to send the chosen brake-application or brake-release characteristic to the control module. For example, the selector module and/or the control module can be in the form of a hardware or software module. The control module is designed to control the operational actuator on the basis of the chosen brake-application or brake-release characteristic. In particular the control module is designed, on the basis of the brake-application or brake-release characteristic, to generate a control signal and send it to the operational actuator whereby, on the basis of the said control signal, the operation actuator is moved along its travel path.

In a first specific implementation it is provided that the parking brake system comprises an input device, in particular within the inside space of the vehicle, for the manual selection of brake-application and/or brake-release characteristics, while the selector module is designed, on the basis of a selection command from the said input device, to select a corresponding brake-application and/or brake-release characteristic. In particular, by way of the input device a number of predefined brake-application and/or brake-release characteristics that correspond to a current vehicle condition can be selected manually by the user and sent to the selector module as a selection command. Preferably, for that purpose the input device is connected for signal exchange with the selector module. By selecting the brake-application or brake-release characteristic manually, the user himself can decide whether and which brake-application or brake-release characteristic is most suitable for the current vehicle condition.

In an alternative or optionally additional implementation it is provided that the selector module is designed, on the basis of the current vehicle condition, to select automatically an associated brake-application and/or brake-release characteristic. In particular, the selector module is designed to choose an appropriate brake-application and/or brake-release characteristic on the basis of a selection criterion. For example, for that purpose a current vehicle condition and, optionally, at least one vehicle parameter can be sent to the selector module, so that on the basis of the vehicle condition and if appropriate the vehicle parameter the selector module automatically selects an associated brake-application and/or brake-release characteristic. In particular the control unit comprises a recognition module which is designed to recognize a current vehicle condition and pass it on to the selector module. For example, the vehicle has one or more sensors and the recognition module is designed to recognize a current vehicle condition on the basis of the sensor data.

In a further embodiment it is provided that the control unit comprises a memory module, such that in the memory module at least one brake-application and/or brake-release characteristic for unloaded operation and/or for loaded operation and/or for trailer operation is stored. Preferably the selector module accesses the memory module, for which purpose the memory module is connected so as to exchange signals with the selector module. The memory module is for example in the form of a local data carrier.

A further object of the invention relates to a utility vehicle with the parking brake system as already described above. In particular, the utility vehicle is an agricultural vehicle, preferably a tractor.

BRIEF DESCRIPTION OF THE DRAWINGS

Further features, advantages and effects of the invention emerge from the following description of preferred example embodiments of the invention. The attached figures show.

DETAILED DESCRIPTION

Figure 1:
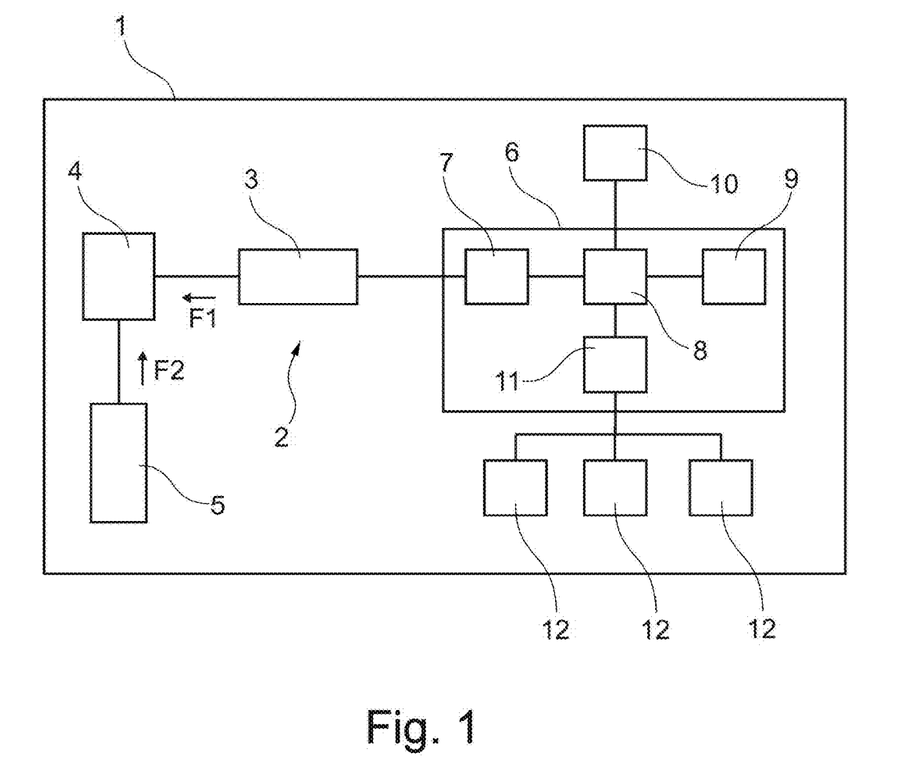
FIG. 1: A very schematic representation of a vehicle with a parking brake system, as an example embodiment of the invention.

FIG. 1 shows a very schematic representation of a vehicle 1 with a parking brake system 2, as an example embodiment of the invention. The parking brake system 2 has the function of braking and/or locking one or more wheels, in particular the wheels of the rear axle (not shown) of the vehicle 1 as a function of an operating condition of the vehicle. The said vehicle 1 is in particular an agricultural utility vehicle, such as a tractor.

The parking brake system 2 comprises an operational actuator 3, which for the actuation of a parking brake transmits a first braking force F1 to one or more wheel brake cylinders 4 of the vehicle 1. The operational actuator 3 has in particular the function of locking the vehicle wheels when the vehicle 1 is at rest and/or is parked. For example, the operational actuator 3 can be in the form of an electric and/or a mechanical and/or a hydraulic and/or a pneumatic actuator. For example, the operational actuator 3 can be operated manually by the driver, or automatically, for example when the driver leaves the driving seat.

The vehicle 1 also comprises a brake actuator 5, which in order to actuate a service brake transmits a second braking force F2 to the wheel brake cylinder 4 of the vehicle 1. In particular the brake actuator 5 has the function of braking the vehicle wheels during driving operation, in order to slow down the vehicle 1. In particular, the operational actuator 3 and the brake actuator 5 can be actuated independently of one another.

The vehicle 1 comprises a control unit 6 that serves to control the operational actuator 3. For this, the operational actuator 3 is for example connected for signal exchange and/or electrically with the control unit 6. For example, the control unit 6 can be in the form of a control device of the vehicle 1.

The control unit 6 comprises a control module 7, a selector module 8 and a memory module 9. In the memory module 9 are stored a plurality of brake-application and/or brake-release characteristics, which on the basis of a selection criterion can be selected by the selector module 8 and sent to the control module 7. The control module 7 is designed to activate the operational actuator 3 on the basis of the brake-application and/or brake-release characteristics supplied to it.

For that purpose, for different vehicle conditions different brake-release or brake-application characteristics can be stored in the memory module 9. For example, a first vehicle condition is defined by unloaded operation ("Vehicle unloaded"), a second vehicle condition by loaded operation ("Vehicle loaded") and a third vehicle condition by trailer operation ("Vehicle with an attachment or trailer"). In that case, for the unloaded operation an unloaded-operation brake-application characteristic and an unloaded-operation brake-release characteristic K1, for the loaded operation a loaded-operation brake-application characteristic K5 and a loaded-operation brake-release characteristic K3, and for trailer operation a trailer-operation brake-application characteristic K4 and a trailer-operation brake-release characteristic K2 can be stored in the memory module 9. The brake-application and brake-release characteristics K1 to K5 can optionally be chosen manually by a user and/or automatically by the selector module 8 on the basis of a selection criterion.

For manual selection the vehicle 1 has an input device 10 inside the vehicle 1, which is connected for signal exchange to the selector module 8. Depending on the current vehicle condition, by means of the input device 10 the user can select an appropriate brake-application characteristic K4, K5 when stopping the vehicle 1 and an appropriate brake-release characteristic K1, K2, K3 when starting up the vehicle 1. During this a selection command is sent to the selector module 8, and on the basis of the selection command the selector module 8 sends the chosen brake-application or brake-release characteristic to the control module 7.

For automatic selection, on the basis of the current vehicle condition and having regard to the selection criterion, an appropriate brake-application or brake-release characteristic is chosen. For example, the selection criterion can be implemented by a selection logic, a comparison, or the like. For this, the current vehicle condition is communicated to the selector module 8, and on the basis of the vehicle condition the selector module 8 chooses a suitable brake-application or brake-release characteristic K1 to K5. In this case a brake-application characteristic K4, K5 is chosen when the parking brake is applied manually by the user or automatically, and a brake-release characteristic K1, K2, K3 is chosen when the parking brake is released manually by the user or automatically. For example, the vehicle condition can be specified manually by the user by way of the input device 10. Alternatively, the control unit 7 comprises a recognition module 11 which is designed to recognize the current condition of the vehicle 1. For that, the vehicle 1 can be equipped with one or more sensors 12, and the recognition module 11 is designed to determine the current vehicle condition on the basis of the sensor data.

FIGS. 2 to 6 shows in each case a brake-application or brake-release characteristic K1 to K5 as a movement-time graph, such that in each case the time t is plotted along the horizontal axis of the graph and a movement x of the operational actuator 3 is plotted along the vertical axis of the graph. Here, on the basis of the brake-release characteristics K1, K2, K3 the operational actuator 3 basically moves in a first time range B1 from a brake-application position E to a brake-release position A and then, in a second time range B2, it is held in the brake-release position A. On the basis of the brake-application characteristics K4, K5, the operational actuator 3 is basically moved in the first time range B1 from the brake-release position A to the brake-application position E and is then held in the second time range 2 in the brake-application position E.

Figure 2:
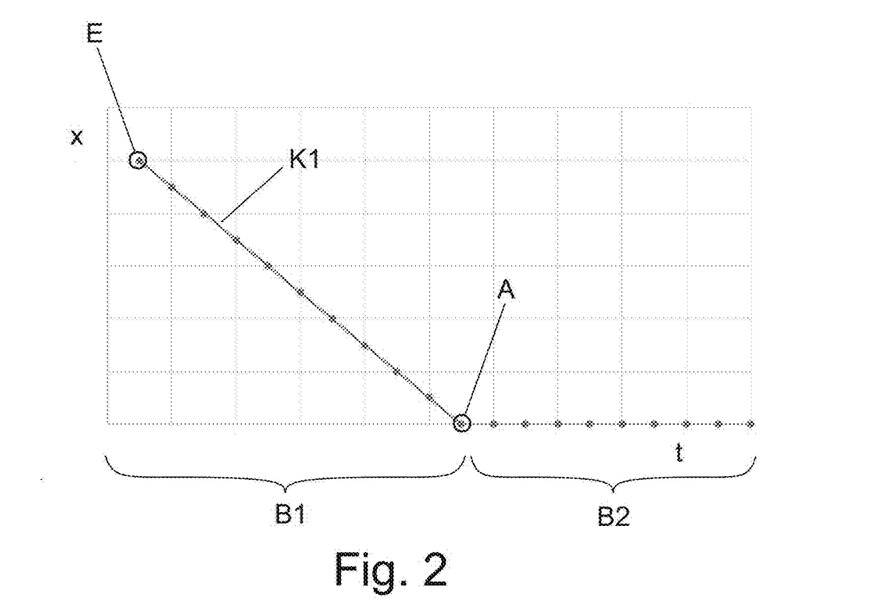
FIG. 2: An unloaded-operation brake-release characteristic for the parking brake system of FIG. 1.

FIG. 2 shows an unloaded-operation brake-release characteristic K1, such that during the first time range B1 the unloaded-operation brake-release characteristic K1 falls in a strictly monotonic manner from the brake-application position E in the direction toward the brake-release position A. Thus, on the basis of the unloaded-operation brake-release characteristic K1 the operational actuator 3 moves constantly or continuously from the brake-application position E to the brake-release position A.

Figure 3:
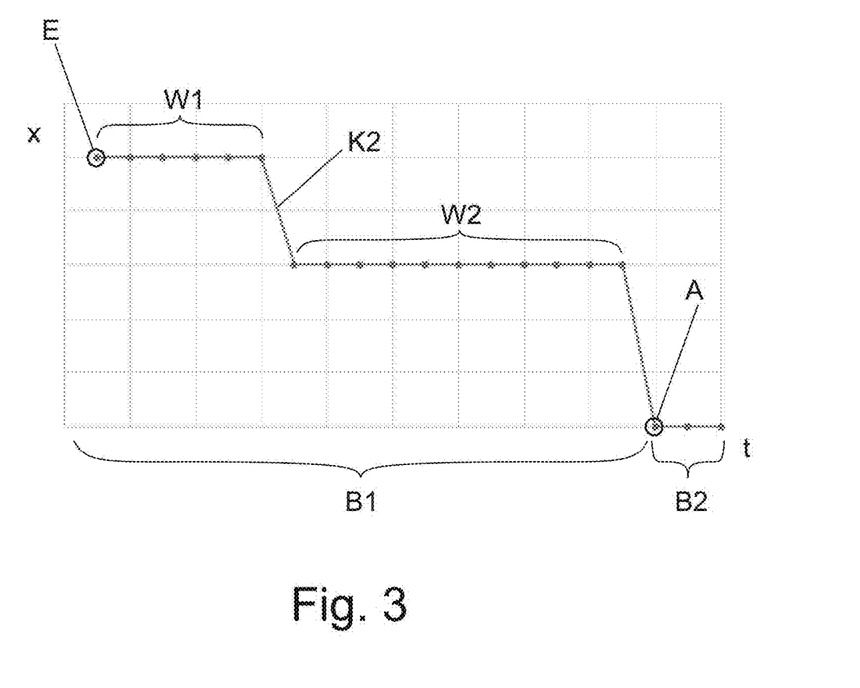
FIG. 3: A trailer-operation brake-release characteristic for the parking brake system of FIG. 1.

FIG. 3 shows a trailer-operation brake-release characteristic K2, such that during the first time range B1 the trailer-operation brake-release characteristic K2 falls monotonically from the brake-application position E toward the brake-release position A. In this case, in the first time range B1 a first waiting period and a second waiting period W1, W2 are provided, such that in the waiting time periods W1, W2 the trailer-operation brake-release characteristic K2 follows a constant course. Thus, on the basis of the trailer-operation brake-release characteristic K2 the operational actuator 3 moves from the brake-application position E to the brake-release position A with pauses in the waiting periods W1, W2, such that during those waiting periods W1, W2 the parking brake is not released any farther. Since compared with the vehicle brakes, the trailer brakes as a rule react more slowly or after some delay, it is in this way ensured that during the pauses defined by the waiting periods W1, W2 the trailer brakes can be released.

Figure 4:
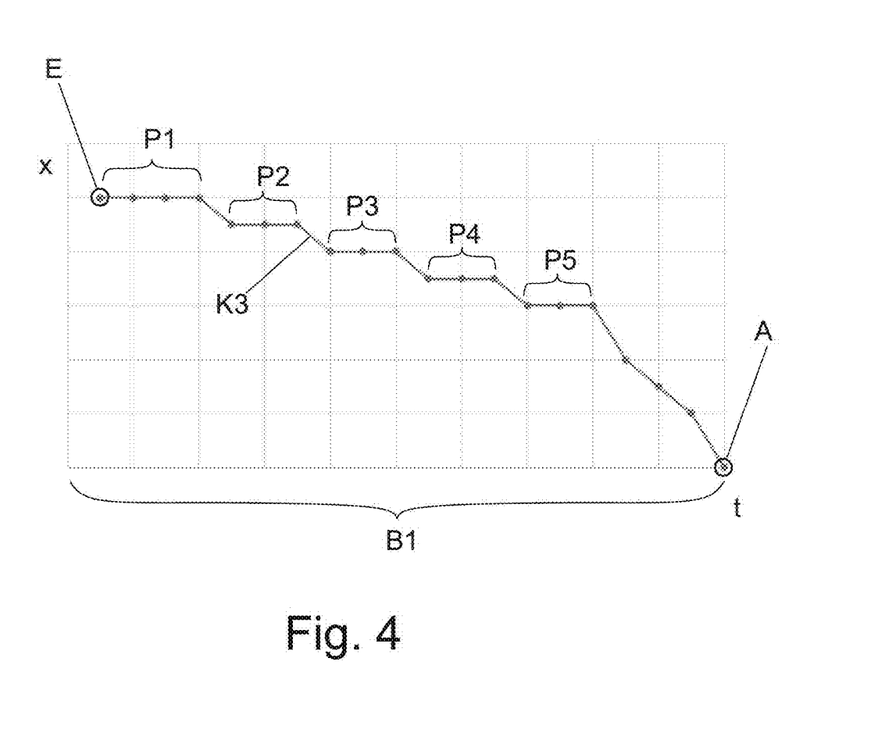
FIG. 4: A loaded-operation brake-release characteristic for the parking brake system of FIG. 1.

FIG. 4 shows a loaded-operation brake-release characteristic K3, such that during the first time range B1 the loaded-operation brake-release characteristic K3 falls monotonically from the brake-application position E toward the brake-release position A. In this case, during the first time range B1 a plurality of pauses P1 to P5 are provided, preferably all of equal duration, such that in the said pause ranges P1 to P5 the trailer-operation characteristic K2 remains constant. Thus, on the basis of the trailer-operation characteristic K2 the operational actuator 3 moves from the brake-application position E to the brake-release position A in steps. Due to this step-wise release of the parking brake, a clutch modulation is made possible, so that starting off under heavy loads, especially on steeply inclined surfaces, is assisted by the parking brake and rolling back of the vehicle 1 is prevented.

Figure 5:
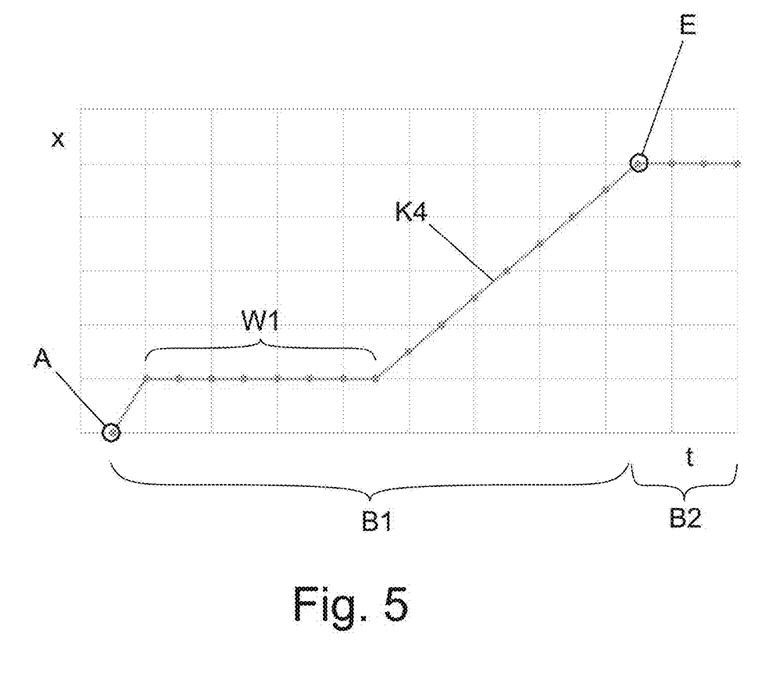
FIG. 5: A trailer-operation brake-application characteristic for the parking brake system of FIG. 1.

FIG. 5 shows a trailer-operation brake-application characteristic K4, such that during the first time range B1 the trailer-operation brake-application characteristic K4 rises monotonically from the brake-release position A toward the brake-application position E. In this case, during the first time range B1 a waiting period W1 is provided, such that during the said waiting period W1 the trailer-operation brake-application characteristic K4 remains constant. Thus, on the basis of the trailer-operation brake-application characteristic K4 the operational actuator (3) moves from the brake-release position A toward the brake-application position E with a pause during the waiting period W1, such that during the said waiting period W1 the parking brake is not applied any farther, so that during this pause the trailer brakes can be activated.

Figure 6:
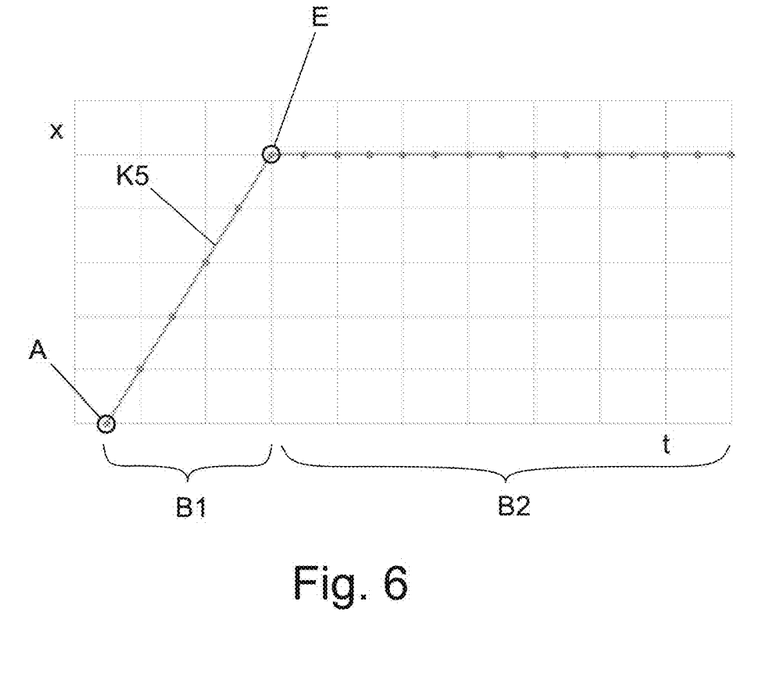
FIG. 6: A loaded-operation brake-application characteristic for the parking brake system of FIG. 1.

FIG. 6 shows a loaded-operation brake-application characteristic K5, such that in the first time rage B1 the loaded-operation brake-application characteristic K5 rises strictly monotonically from the brake-release position A toward the brake-application position E. Thus, on the basis of the loaded-operation brake-application characteristic K5 the operational actuator 3 moves progressively or continuously from the brake-release position A to the brake-application position E. The slope of the characteristics K1 to K5 shown in the graphs corresponds in these cases to the value of the actuation speed. Here, compared with the characteristics K1 to K4 the characteristic K5 follows a substantially steeper course, so that on the basis of the loaded-operation brake-application characteristic K5 the operational actuator 3 moves at a substantially higher speed. In that way, during loaded operation the parking brake can be applied much more quickly, in order to prevent the vehicle 1 from rolling while at rest or rolling on when stopped.

INDEXES

1 Vehicle
2 Parking brake system
3 Operational actuator
4 Wheel brake cylinder
5 Brake actuator
6 Control unit
7 Control module
8 Selector module
9 Memory module
10 Input device
11 Recognition module
12 Sensors
A Brake-release position
B1, B2 Time ranges
E Brake-application position
F1 First braking force
F2 Second braking force
K1 to K5 Brake-application and brake-release characteristics
P1, P2 Pause sections
W1, W2 Waiting periods
t Time
x Travel path

The invention claimed is:

1. A method for actuating a parking brake system in a utility vehicle, wherein the parking brake system comprises an operational actuator for actuating a parking brake and wherein the parking brake system comprises a control unit for controlling the operational actuator, the method comprising:
  selecting, when the utility vehicle is stopped, a brake-application characteristic stored in the control unit for the parking brake, the brake-application characteristic selected as a function of a current vehicle condition of the utility vehicle, wherein the current vehicle condition corresponds to one or more of an unloaded operation, a trailer operation, and a loaded operation of the utility vehicle;
  actuating the operational actuator, by the control unit, based on the brake-application characteristic in order to apply the parking brake;
  selecting, when the utility vehicle is started off, a brake-release characteristic stored in the control unit for the parking brake, the brake-release characteristic selected as a function of the current vehicle condition of the utility vehicle; and
  actuating the operational actuator, by the control unit, on the basis of the brake-release characteristic in order to release the parking brake;
  moving the operational actuator within a first time range from a brake-application position to a brake-release position, based on the brake-release characteristics, wherein for each vehicle condition a respective associated brake-release characteristic is stored in the control unit;
  moving the operational actuator within the first time range from the brake-release position to the brake-application, based on the brake-application characteristics; and
  storing in the control unit an associated brake-application characteristic for the respective current vehicle condition.

2. The method according to claim 1, comprising adjusting a travel path of the operational actuator as a function of time based on the brake-application and/or the brake-release characteristics.

3. The method according to claim 1, comprising:
  releasing the parking brake based on an unloaded-operation brake-release characteristic, wherein the unloaded-operation brake-release characteristic is stored, such that in the first time range the unloaded-operation brake-release characteristic follows a strictly monotonically falling course, and/or applying progressively the parking brake based on an unloaded-operation brake-application characteristic, wherein for unloaded operation the unloaded-operation brake-application characteristic is stored, such that in the first time range the unloaded-operation brake-application characteristic follows a strictly monotonically rising course.

4. The method according to claim 1, comprising:
not releasing the parking brake any farther during a waiting section, based on a trailer-operation brake-release characteristic, wherein for the trailer operation the trailer-operation the brake-release characteristic is stored, such that in the first time range the trailer-operation brake-release characteristic includes at least one waiting section, and/or
not applying the parking brake any farther during the waiting section based on a trailer-operation brake-application characteristic, wherein for the trailer operation the trailer-operation brake-application characteristic is stored, such that in the first time range the trailer-operation brake-application characteristic includes at least one waiting section.

5. The method according to claim 1, comprising:
applying the parking brake based on a loaded-operation brake-application characteristic such that the parking brake is applied more rapidly for the loaded operation than during the unloaded operation and/or during the trailer operation, wherein for the loaded operation a loaded-operation brake-application characteristic is stored, such that in the first time range the loaded-operation brake-application characteristic follows a strictly monotonically rising course, wherein during the first time range the loaded-operation brake-release characteristic has a steeper slope than the unloaded-operation brake-application characteristic and/or the trailer-operation brake-application characteristic, so that on the basis of the loaded-operation brake-application characteristic the operational actuator moves to a substantially higher speed.

6. The method according to claim 1, wherein for loaded operation a loaded-operation brake-release characteristic is stored, such that during the first time range the loaded-operation brake-release characteristic includes a plurality of pause sections, so that on the basis of the loaded-operation brake-release characteristic the parking brake is released in steps between the individual pause sections.

7. The method according to claim 1, wherein for loaded operation a loaded-operation brake-release characteristic is stored, such that during the first time range the loaded-operation brake-release characteristic includes a plurality of pause sections, so that on the basis of the loaded-operation brake-release characteristic the parking brake is released in steps between the individual pause sections.

8. The method according to claim 3, wherein for loaded operation a loaded-operation brake-release characteristic is stored, such that during the first time range the loaded-operation brake-release characteristic includes a plurality of pause sections, so that on the basis of the loaded-operation brake-release characteristic the parking brake is released in steps between the individual pause sections.

9. The method according to claim 4, wherein for loaded operation a loaded-operation brake-release characteristic is stored, such that during the first time range the loaded-operation brake-release characteristic includes a plurality of pause sections, so that on the basis of the loaded-operation brake-release characteristic the parking brake is released in steps between the individual pause sections.

10. The method according to claim 5, wherein for loaded operation a loaded-operation brake-release characteristic is stored, such that during the first time range the loaded-operation brake-release characteristic includes a plurality of pause sections, so that on the basis of the loaded-operation brake-release characteristic the parking brake is released in steps between the individual pause sections.

11. The method according to claim 1, comprising:
recognizing automatically the current vehicle condition; and
selecting, based on recognizing the current vehicle condition, a brake-release characteristic when starting off; and/or
selecting, based on recognizing the current vehicle condition, a brake-application characteristic when stopping.

12. The method according to claim 1, comprising:
manually selecting the brake-application and/or brake-release characteristics based on the current vehicle condition.

13. The method according to claim 1, comprising:
automatically selecting the brake-application and/or brake-release characteristics based on the current vehicle condition.

14. A parking brake system for a utility vehicle, comprising:
an operational actuator for actuating a parking brake, wherein to transmit a braking force to at least one wheel brake cylinder the operational actuator can be moved along a travel path between a brake-application position and a brake-release position;
a control unit for controlling the operational actuator, wherein the control unit comprises a control module configured to control the operational actuator when the utility vehicle is staring up and/or stopping; and
wherein the control unit comprises a selector module configured, on the basis of a vehicle condition that corresponds to one or more of an unloaded operation, a trailer operation, and a loaded operation of the utility vehicle, to select a brake-application and/or brake-release characteristic stored in the control unit for the parking brake, and wherein the control module is configured to activate the operational actuator on the basis of the brake-application and/or brake-release characteristic selected.

15. The parking brake system according to claim 14, further comprising an input device configured for manual selection of the brake-application and/or brake-release characteristic, wherein the selector module is configured, on the basis of a selection command from the input device, to select a corresponding brake-application and/or brake-release characteristic.

16. The parking brake system according to claim 14, wherein the selector module is configured, on the basis of the current vehicle condition, to select an associated brake-application and/or brake-release characteristic automatically.

17. The parking brake system according to claim 14, wherein the control unit comprises a memory module, such that in the memory module at least one brake-application and/or brake-release characteristic for unloaded operation and/or for loaded operation and/or for trailer operation is stored.

18. A utility vehicle comprising the parking brake system of claim 14.

19. The utility vehicle of claim 18, wherein the utility vehicle is a tractor.

* * * * *